(12) United States Patent
Lancieri (10) Patent No.: US 7,460,715 B2
(45) Date of Patent: Dec. 2, 2008

(54) FUZZY ASSOCIATIVE SYSTEM FOR MULTIMEDIA OBJECT DESCRIPTION

(75) Inventor: Luigi Lancieri, Evrecy (FR)

(73) Assignee: France Telecom, Paris (FR)

( * ) Notice: Subject to any disclaimer, the term of this patent is extended or adjusted under 35 U.S.C. 154(b) by 569 days.

(21) Appl. No.: 10/526,090

(22) PCT Filed: Aug. 27, 2003

(86) PCT No.: PCT/FR03/02588

§ 371 (c)(1),
(2), (4) Date: Feb. 24, 2005

(87) PCT Pub. No.: WO2004/021265

PCT Pub. Date: Mar. 11, 2004

(65) Prior Publication Data

US 2005/0249418 A1    Nov. 10, 2005

(30) Foreign Application Priority Data

Aug. 30, 2002  (FR)  .................................. 02 10776

(51) Int. Cl.
*G06K 9/62*    (2006.01)

(52) U.S. Cl. ...................................... 382/224; 382/209

(58) Field of Classification Search ................. 382/228, 382/224

See application file for complete search history.

(56) References Cited

U.S. PATENT DOCUMENTS 5,970,171 A * 10/1999 Baraghimian et al. ....... 382/187

(Continued)

FOREIGN PATENT DOCUMENTS

EP    1026601    1/2000

(Continued)

OTHER PUBLICATIONS

"Learning of Personal Visual Impression for Image Database Systems", T. Kurita, et al., Oct. 20, 1993, pp. 547-552, Proceedings of the Inter'l Conf. on Document Analysis and Recognition.

(Continued)

*Primary Examiner*—Matthew C Bella
*Assistant Examiner*—Sath V. Perungavoor
(74) *Attorney, Agent, or Firm*—Cohen Pontani Lieberman & Pavane LLP (57) ABSTRACT

The invention concerns a method for automatic description of an unknown multimedia object, which consists in associating the unknown object with several types of reference multimedia objects each time based on a membership probability particular to each type concerned (G), the method including a step which consists in measuring at least one physical characteristic on the unknown object (F) and in comparing it with measurements of characteristics representing best the reference types, the method further comprising the step (H) which consists in using for each type at least one probabilistic relationship providing a membership probability to the type concerned based on the result of the comparison of the characteristics of the unknown object and of the type, the method further comprising the step which consists in using the probabilities of membership to the various types thus obtained in combination with a series of affinity relationships between types, so as to select memberships which both constitute the majority in terms of probability and which designate one another by their affinity relationship, and so as to exclude memberships with less affinity with the selected types.

13 Claims, 5 Drawing Sheets

U.S. PATENT DOCUMENTS

| | | | |
|---|---|---|---|
| 6,125,208 A * | 9/2000 | Maier et al. | 382/228 |
| 6,400,996 B1 * | 6/2002 | Hoffberg et al. | 700/83 |
| 6,847,980 B1 * | 1/2005 | Benitez et al. | 707/104.1 |
| 7,325,735 B2 * | 2/2008 | Kurzweil et al. | 235/454 |
| 7,327,887 B2 * | 2/2008 | Wenzel | 382/209 |
| 2001/0044719 A1 * | 11/2001 | Casey | 704/245 |
| 2002/0028021 A1 * | 3/2002 | Foote et al. | 382/224 |
| 2002/0183984 A1 * | 12/2002 | Deng et al. | 703/1 |
| 2005/0249418 A1 * | 11/2005 | Lancieri | 382/228 |
| 2008/0063285 A1 * | 3/2008 | Porikli et al. | 382/190 |

FOREIGN PATENT DOCUMENTS

| | | |
|---|---|---|
| WO | WO 01/03008 | 1/2001 |
| WO | WO 01/24056 | 4/2001 |

OTHER PUBLICATIONS

"Content-Based Indexing of Multimedia Databases", J. Wu, et al., IEEE Transactions on Knowledge and Data Engineering, IEEE Inc. New York, vol. 9, No. 6, Nov. 1997, pp. 978-989.

\* cited by examiner

FUZZY ASSOCIATIVE SYSTEM FOR MULTIMEDIA OBJECT DESCRIPTION

The present patent application is a non-provisional application of International Application No. PCT/FR2003/002588, filed Aug. 27, 2003.

BACKGROUND OF THE INVENTION

The invention relates to the characterization of multimedia objects, and particularly techniques for reducing ambiguities in the recognition of multimedia objects.

The invention also relates particularly to the description of the contents of multimedia files associated with objects.

The purpose of the invention is particularly to propose a method for describing and comparing objects in an uncertainty context.

For example, in practice the invention is intended to describe and compare image, music, video and other files.

It provides an answer to the questions of the type: I would like to find music tracks corresponding to "my taste". This type of operation introduces two problems. The first is to model concepts such as "my taste" which are very subjective. A great deal of work has been done on this problem for objects that can be put into a text context. In this presentation, we will be particularly interested in isolated objects without a text context. This is the second difficulty that we propose to solve, namely how to extract characteristics from an isolated object that can be used to describe it and to compare it, the objective being to achieve a semantic characterization (e.g. in the form of keywords) in terms of probability.

SUMMARY OF THE INVENTION

Within the context of the invention, these objectives are achieved by means of an automatic description method for an unknown multimedia object in which the unknown object is associated with several types of reference multimedia objects each time depending on a probability of membership to each considered type, the method including a step consisting of measuring at least one physical characteristic on the unknown object and comparing it with measurements of characteristics best representing the reference types, the method also including the step consisting of using at least one probabilistic relation for each type giving a probability of membership to the type considered as a function of the result of the comparison of characteristics of the unknown object and the type, the method also including the step consisting of using probabilities of membership to the different types thus obtained in combination with a series of affinity relations between types, so as to elect memberships that are majority in probability and are also co-designated by their affinity relation, so as to exclude memberships with a lower affinity with elected types.

The invention also proposes an automatic description device for an unknown multimedia object comprising means of associating the unknown object with several types of reference multimedia objects each time according to a probability of membership to the type considered, the device including means of measuring at least one physical characteristic on the unknown object and comparing it with measurements best representing the reference types, the device also including means using at least one probabilistic relation for each type giving a probability of membership to the type considered depending on the result of the comparison of characteristics of the unknown object and the type, the device also including means of using probabilities of membership to different types and obtained in combination with a series of affinity relations between types, so as to elect memberships that are both majority in probability and are co-designated by their affinity relation, and so as to exclude memberships with a lower affinity with the elected types.

BRIEF DESCRIPTION OF THE DRAWINGS

Other characteristics, purposes and advantages of the invention will become clearer after reading the detailed description given below with reference to the appended figures wherein.

DETAILED DESCRIPTION OF THE PRESENTLY PREFERRED EMBODIMENTS

The method used is highly adaptable. Three aspects are discussed below, namely associative networks (semantic links between reference objects), fuzzy logic (management of uncertainty) and a step called "correlative inference" (limit ambiguity by cross-checking information).

This approach is higher up in the layers than the current approach that is very much on the input side and is intended specifically to optimize precision and modeling of the image, and more generally the object. The unprocessed model of the image (sound, etc.) will be used even if it is bad quality, and an attempt will be made to reduce ambiguity of interpretation due to uncertainty management methods (cross reference, fuzzy logic).

The description operation is preferably done by comparing unknown objects with objects with known characteristics and by cross-checking, and will lead to a characteristic vector associated with a membership probability. This vector translates the relation between physical or logical properties and conceptual properties (see FIGS. 1a, 1b).

The method described below is intended for characterization in an uncertainty context and is applicable to objects regardless of their nature (analog, digital, symbolic, etc.). Having said this, for reasons of clarity, we will restrict the explanations given below to multimedia type files (e.g. mp3, mpeg, wav, jpg, etc.). These objects may for example be described by some physical properties of subjacent analog objects (frequencies, duration, typical shapes, etc.) Moreover, these same objects may be described in a conceptual register by an appropriate topology (pop music, jazz, action film, car photo) or a preferred type without it being specifically referenced (e.g. a personalized mix of jazz and classical music). A first objective is to apply associative correspondence between the physical domain and the conceptual domain.

Figure 1A:
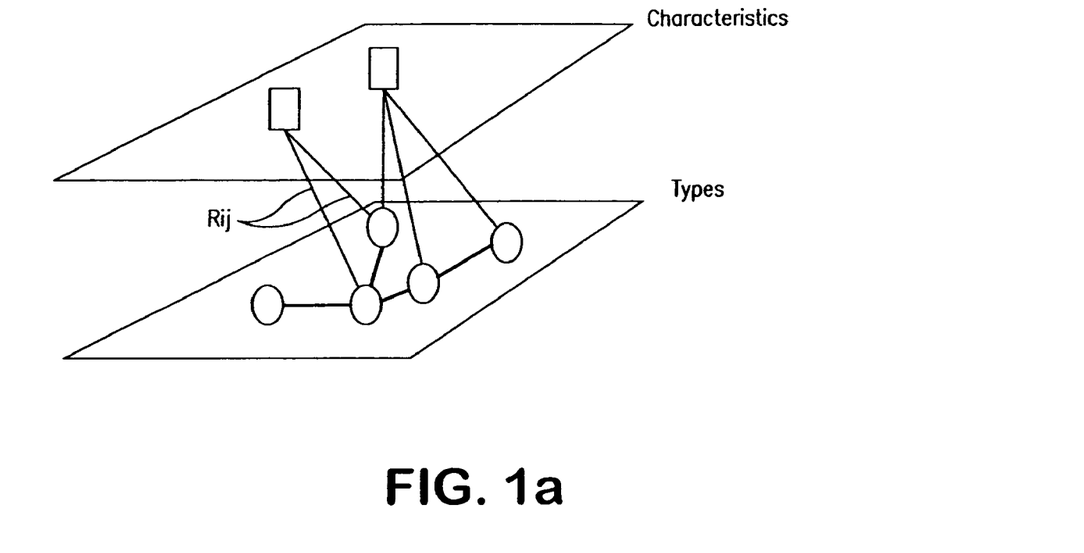
FIGS. 1a and 1b diagrammatically show associative modes, the first mode in a "types" plane, the second as a learning mode.
Figure 1B:
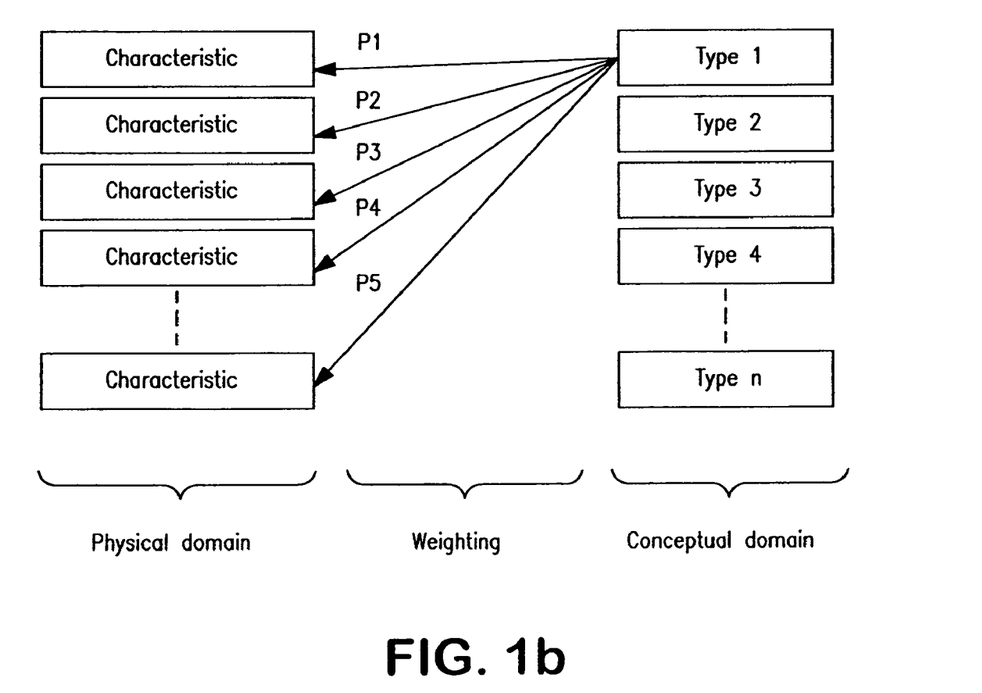

FIGS. 1a and 1b present two associative modes. The first (FIG. 1a) in the types plane is a classical conceptual association (for example between lexical themes interconnected by weighted relations as a function of their semantic proximities). The second (FIG. 1b) is obtained by learning between the types and the reference characteristics. This type of architecture makes it possible to identify conceptual relations between physical or logical characteristics, by intersection.

For example, types may be words and characteristics may be shapes in the case of images.

Characteristics should preferably be chosen once and for all for a set of given types, but an expertise has to be carried out. For example, a musician and an electronics engineer would be capable of identifying the representative magnitudes of the musical typology (for example average frequency of the first 10 seconds of a piece of music to distinguish between piped music and a hard rock track). In the following examples, we will only use simplified characteristics to describe our method.

The following is a first example corresponding to the case of sound documents, to describe the principle.

The sound signal coded in a music file (e.g. wav, mp3) has to be accessed in order to determine whether or not it contains a flute or a horn track (two simple conceptual types).

This is done by conventional decoding algorithms. The signal will be analyzed using appropriate signal processing tools that can determine its frequency (for example simplified physical characteristic). If reference files are considered (several horn type files, several flute type files), the average frequency can be determined in the case of the horn and in the case of the flute. It can be observed that the frequency A+delta f is the value for the flute and the frequency B+delta f is for the horn. These frequencies and associated types will be the reference model obtained by a statistical study on a representative sample. The frequency fi of a number of files containing sounds of unknown instruments can be calculated to determine whether they belong to the flute category or the horn category depending on their vicinity (if fi−A<threshold then i close to flute). It would also be possible for all "horn" type reference files to contain files without a horn. The average frequency would then intrinsically include a margin of error and its proximity with the frequency of a file to be analyzed would be analyzed probabilistically, also to take account of the fact that the calculation of the average is made by calculating a probable average (mathematical expectancy).

This example is very much simplified since a sound file (and the situation for video files is even more complicated) is usually a complex combination of different frequencies in time and in space.

To solve this complexity problem, a number of spatial and temporal (fixed and variable) frequency characteristics are preferably identified, which in theory can be used to describe any signal. We will now give another more precise example of a definition of such characteristics. A spectral analysis of the signal throughout its duration provides a means of recovering the high and low frequency ratio. We will only consider ten frequency ranges (f1 to f10) distributed throughout the audible spectrum (20 Hz to 20 kHz) for example df1=20 Hz-500 Hz, df2=500 Hz-2 kHz, df3=2<kHz-5<kHz etc. In practice, the frequency breakdown will take account of the fundamental frequency of the main instruments. This analysis can be done at different signal periods. For example, we calculate the frequency distribution on ten second spaces separated by thirty seconds on a signal lasting three minutes.

The six sets of ten frequency ranges (that we will call samples) will be considered as being the physical characteristics of a signal of the music track. If we know a reference music track "that we like" as in the example above (without necessarily knowing how to describe it conceptually—it may be jazz or blues, etc.), we can calculate the reference sample for any music track, and subsequently apply the calculation of the sample and compare it with the reference sample). Depending on the physical proximity, we can deduce the conceptual proximity with regard to this type "that we like". In other words, as the distance between the spatial, frequency and temporal characteristics of the signal to be sorted and the characteristics of the reference signal become closer, we will become more certain that the track to be sorted is a track of this type "that we like".

If we have defined several types of tracks that we like, the proximity of the characteristics of the unknown track can be compared with the characteristics of each of these types.

We will then obtain a series of probabilities of membership of the unknown track for each of these types. The types of tracks that we like themselves have compatibilities or affinities. Thus, some of these types will be musically similar in terms of perception, for example such as a "rock" type or a "hard-rock" type.

Other types, such as "chamber music" and "electronic music", are incompatible.

We will use this ear perception affinities network between different types, and probabilities of membership to different types, to deduce a membership to a wider category including only some of these types that we like. We will choose to call this step a "correlative inference".

This membership to a wider category finalizes the automated description of the multimedia object that is initially unknown.

In other words, we will use probabilities of membership to the different types thus obtained in combination with a series of affinity relations between types, affinities representative of human perception, so as to elect memberships that are majority in probability and that are co-designated by their affinity relation, and so as to exclude memberships with a lesser affinity with the elected types.

The elections and exclusions that we are describing are materialized in this case by the fact of identifying only one part of the types that we like (in this case a "category").

Similarly, if we use several reference tracks "that we like" to calculate average characteristics, then we are learning reference characteristics. These reference characteristics are an average that can include tracks obtained in error, and therefore this average is a "most probable" reference and the proximity of a considered track to these characteristics is used to give a "probability" that we will like the track. As the track gets closer to the statistical reference, the probability that we will like it will increase. The best probability that we will like it occurs when the characteristics of the track considered and the statistical average of characteristics of the reference tracks are identical.

In the case of visual documents (image and video), characterization of visual documents is preferably based on the same principle as for sound documents. The objective is to measure the proximity with other objects based on simple characteristics. An image is analyzed to identify complex isolated shapes, together with their chromatic characteristics (average, standard deviations on the shape) by searching for contours. These operations are used classically in image processing.

As described above, a set of conceptual types is associated with a set of physical characteristics. These conceptual types may for example include house, animal, flower, etc. Their physical characteristics correspond to simple shapes and their chromatic descriptions.

The next step is to search for proximities between unknown shapes and "statistically" known shapes (see below) or an average forming a "better probability" that we like an image. In this case, the conceptual types are inherent to fixed images (this set is adapted in the case of videos: action, sports, etc., dynamic type information) . As in the case of sound data, video is considered as being a sampling of several images that are treated in isolation and then as contributing to statistical characterization of the film.

In this description we will take account of an uncertainty and ambiguity of the analyses. Living beings make their decisions in a context of uncertainty, in terms of probability. Even decisions that we consider to be obvious satisfy this principle.

When we perceive a person in the distance, our brain uses recognition functions to compare what we perceive with a set of basic characteristics that we have memorized in the past. These operations lead us to the conclusion that the person concerned is probably a friend. When we see this person closer, his identity becomes more obvious, and the same mechanisms that we used previously lead to an equally probabilistic answer. The difference is in that in the second case, the probability is much higher.

We will now describe two mechanisms used in the preferred example embodiment of the invention.

The first is processing and composition (calculation) of approximate premises (maybe, it is possible, etc.). Fuzzy logic gives a number of tools by which we can calculate uncertain elements. The other mechanism is based on cross-checking of information. For example, if the analysis of an image reveals a shape 75% like a truck, 75% like a house, 60% like a bus and 10% like a chalet, we will consider that the shape is a vehicle because semantically the vehicle category (truck and bus) is more "co-designated" than the dwelling category (chalet and house). This is a particular example of what is called correlative inference. This is possible because the conceptual types have their own associative network corresponding to linguistic characteristics (tree, flower and plant are associated but differently). Initially, the search for characteristics and the reconciliation work between these characteristics and conceptual types is made without taking account of the internal associative level between the conceptual types. This association will be used to eliminate some ambiguities on physical/conceptual associations.

Once again, semantic intersections reflect affinities between different types, affinities that are taken into consideration in common with probabilities of membership to each of these types, and are used to determine whether or not there is membership to a category.

In other words, in this example to identify a general membership category, probabilities of membership to different types thus obtained will be used in combination with a series of affinity relations between types, affinities representative of human perception, so as to elect memberships that are both majority in probability and that are co-designated by their affinity relation, so as to exclude memberships with a lower affinity with elected types.

In order to set up affinity relations used in this second step, herein referred to as the "correlative inference step", we will apply preliminary processing of a number of texts in which particularly frequent occurrences of two terms are used, each time close to each other in these texts. Thus, the semantic relation between "house" and "chalet" is identified simply by the frequent presence of these terms close to each other in a series of texts.

On the other hand, the fact that the terms "truck" and "chalet" are almost never present and close to each other, provides a means of identifying that there is no semantic proximity link (affinity) between these words.

For example, the existence of an affinity may be detected as a function of exceeding a frequency threshold within texts of two words close to each other (close because they are only a predefined number of words apart).

This type of prior processing of a series of texts provides a means of automatically setting up affinities between types. Such affinities provide a good representation of human perception in that they correspond to the feeling of affinity between types that can be felt by a person, either affinity between "rock" and "hard-rock" for music, or affinity between "house" and "chalet" for images.

Obviously, in other embodiments, the prior processing of a series of descriptive objects or a series of existing objects provides a means of identifying typical affinities in a similar manner since they are statistically clearly represented as defining a semantic relation between two terms or two characteristics.

In this case, type elections and exclusions consist of simply identifying some of them that together signal the general membership category to which an object belongs.

In this case, the associative network (FIG. 1a, bottom drawing) is composed by learning, as we have just described making use of a series of texts in the example given. The objective now is to identify statistical characteristics of the relation between input (physical, top plane) and output (conceptual, bottom plane). These characteristics are used as input to the fuzzy model. If we consider a set of z relations R between each of the p reference types and one or several of the n characteristics, each relation Rij contains the statistical representation of all examples of this relation provided by the reference objects. The relation contains the average, the standard deviation, min., max. n etc. For example, if the characteristic i of type j in a hundred reference objects is present sixty times, the average of the relation Rij is equal to 0.6.

To make the description clearer, we will now give an example application of decision making from a fuzzy approach. Recognition of image content in this case is the application example.

The objective is to implement relations between shapes and a type, for example a car type, in an associative network. We will limit our description to the context of this example but in practice more characteristics than the shape can be used and more types can be used than the simple car type.

Figure 2:
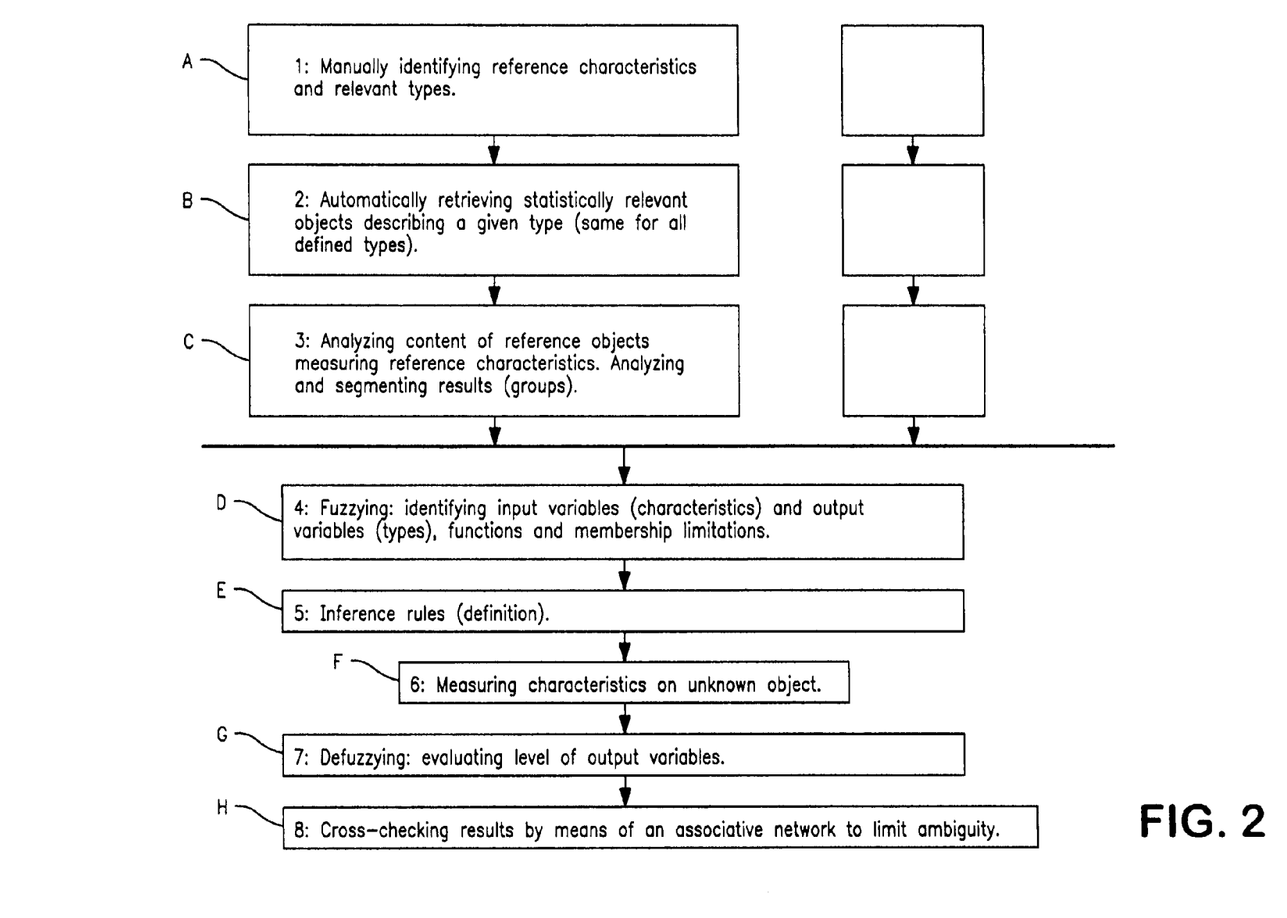
FIG. 2 is a block diagram representing different steps used in a preferred variant of the invention.

In FIG. 2, step A corresponds to a manual identification of reference characteristics (e.g. shapes, average spectrum on the first 10 seconds of a music track) and relevant types (expert work).

Step B is the automatic recovery (search engine and Web-Internet downloader) of statistically relevant objects (for example car image) describing a given type (ditto for all types) starting from keywords (car, automobile, etc.).

Step C is a step to analyze the content of reference objects; measurement of reference characteristics, analysis and segmentation of results (groups). A classical categorization technique is used to identify groups.

These three steps are done for several reference types linked by an associative network. This approach will enable settling some ambiguities in a subsequent step (Step H) by intersection.

Step D corresponds to fuzzying, in other words identification of input variables (characteristics) and output variables (types) of functions and membership limitations, information derived from the previous steps being used to automate this step.

Step E corresponds to a step of definition of inference rules. These rules are generic and correspond to a homogenous composition of AND/OR functions relating inputs to outputs.

Step F is a step for the measurement of characteristics on the unknown object.

Step G is a defuzzying step; evaluation of the level of output variables. This step presented herein in the global sense corresponds to defuzzying of each output. The result is in the form of a probability of membership of the unknown object to each type.

Step H is a step for cross-checking results using an associative network to limit the ambiguity (e.g. if the object is 50% a tree, 50% a car and 50% a truck, then it is certainly not a tree).

We will now describe this block diagram in FIG. 2 in more detail, in a first reference step (steps A to C in FIG. 2), we will recover a large number of images containing cars, and the contours of shapes will be identified using classical software tools. These shapes are normalized (corrected to identical proportions) and compared (Cartesian reference) so as to identify homogenous groups (superposable contour with minimum error). For each of these groups, the average shape called the reference shape is identified (this may be an arbitrary image in the group since segmentation—step C—assures that the members of a group are strongly similar) and the number of candidates per group. It will be stated that the reference shapes containing most candidates best describe the reference type (car). The optimum number of groups will be identified using conventional clustering techniques. For example, the ratio between the average intra groups and inter groups error will be optimized. The shape to shape errors matrix will be used as input to the clustering algorithm.

For the remainder of the example, it is assumed that the ideal number of groups is two. Therefore, there will be two average shapes, each of which will be assigned to a similarity probability depending on the shape % in the group compared with the total number of shapes.

Unlike binary logics (in which a proposal is true or false), fuzzy logic takes account of the "possible" nature of a proposal by associating a degree of probability with it. In addition to a concept, fuzzy logic introduces methods and an appropriate algebra for manipulating fuzzy (approximate) magnitudes.

The first step (step D in FIG. 2) called the fuzzy quantification (or fuzzying) consists of modeling each input in the system by curves giving the degree of membership to the different states of the system possibly associated with these inputs. In our case, the inputs are physical characteristics and the states are conceptual types (or associations of types), and the system is an associative network (normalized weighting) existing between the inputs and outputs (see FIG. 1a).

Figure 3:
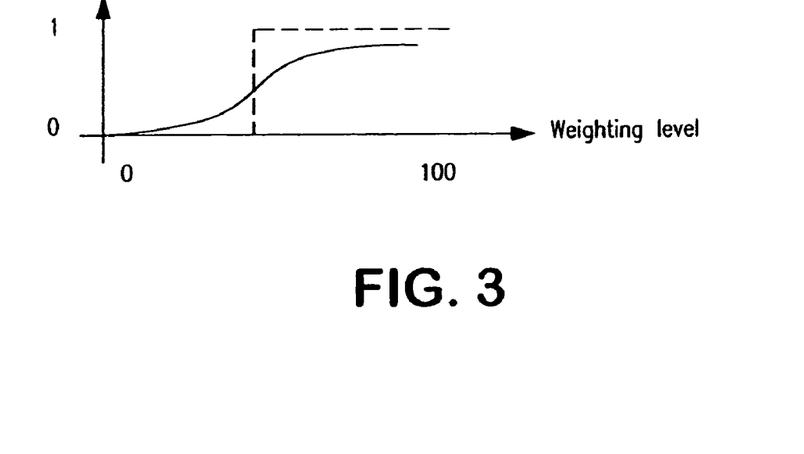
FIG. 3 is a plot showing the membership probability as a function of the weighting of a given physical characteristic.

Thus, each input, depending on its weighting level, will be represented on a sigmoid type curve (FIG. 3 or approximated in FIG. 4) that will explain its level of membership to a given type.

For example, consider a network (FIG. 1) in which the maximum weighting level (normalized) is 100. A physical characteristic that will be related to a conceptual type with a weighting of 10 will be considered as describing it as having a low probability. On the other hand, a weighting of 80 will be considered as a very relevant description.

Figure 4:
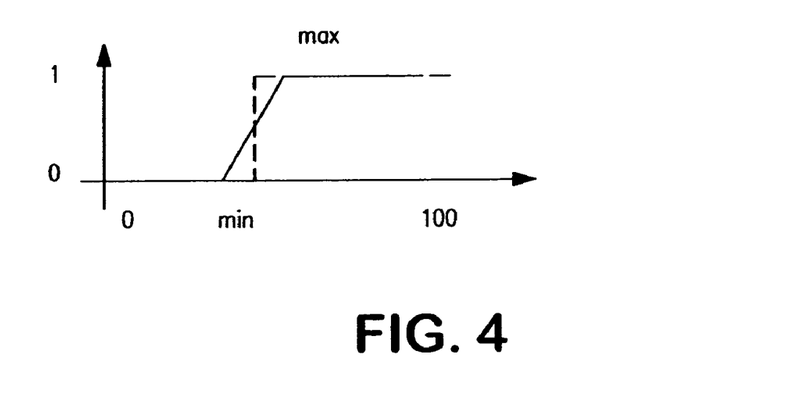
FIG. 4 shows a plot representing an approximation of the above plot.

In FIG. 4, the minimum and maximum values obtained by statistical analysis provide thresholds beyond which the characteristic is no longer considered to describe the type at all (minimum) or to describe it very well (maximum).

Figure 5:
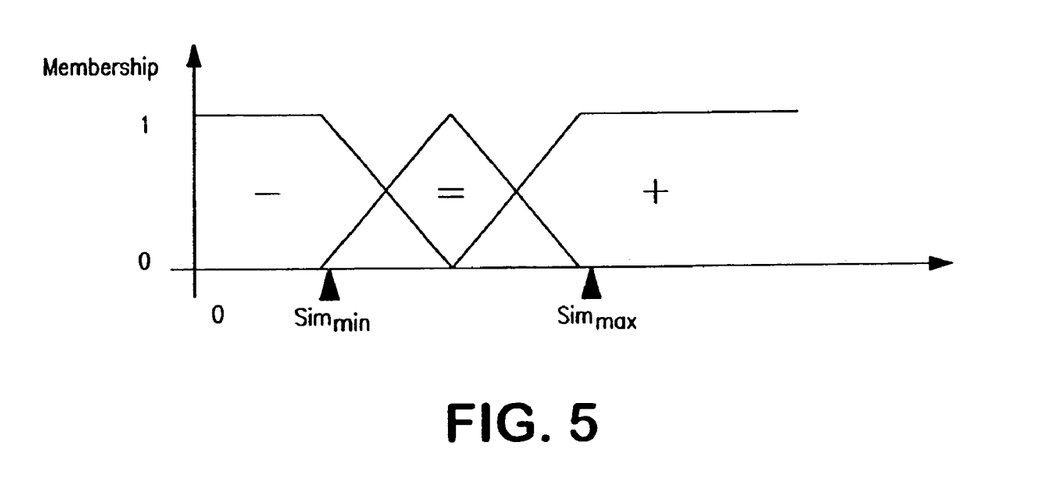
FIG. 5 is a plot representing a membership probability as a function of an error measured on input variables.

The membership function represented in FIG. 5 establishes the level of membership to each fuzzy subset as a function of the error level between the reference shapes (the two average shapes) and the shapes contained in the image to be analyzed.

In FIG. 5, the "−" symbol represents improbable membership. The "=" symbol represents possible membership. The "+" symbol represents very probable membership.

$Sim_{min}$ and $Sim_{max}$ respectively denote minimum similarity and maximum similarity calculated shape to shape in each group during learning. $Sim_{max}$ is the similarity between the two most similar shapes within a given group, and $Sim_{min}$ is the similarity between the two most different shapes within a given group.

Figure 6:
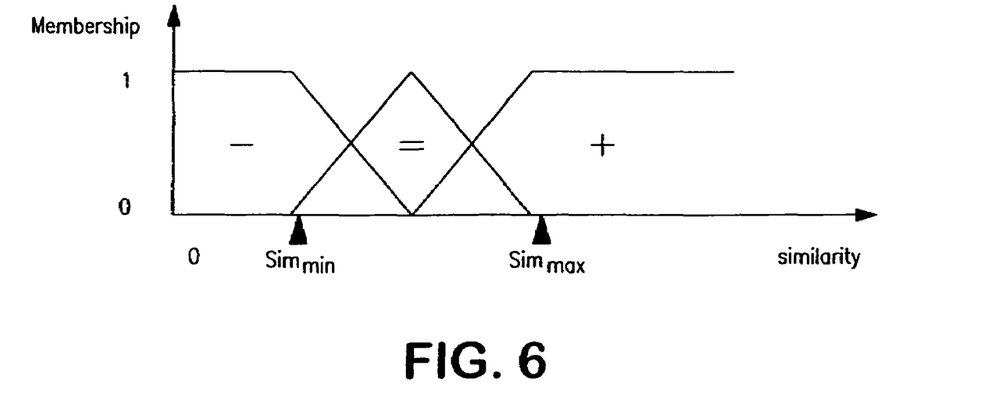
FIG. 6 shows a plot of the same type for an error on the output variable, FIG. 7 and FIG. 8 each show a plot representing a membership probability as a function of an error on a corresponding input characteristic (step 4 in FIG. 2)

Similarly, the membership function is described for the output variable (FIG. 6).

In this description, the values $Sim_{min}$ and $Sim_{max}$ describe the minimum and maximum uncertainties for making a decision. It will be said that below $Sim_{min}$ the shape does not belong to the type, above $Sim_{max}$ it does belong to the type, and between these two values it belongs to the type with a certain probability. For example, I might decide that below 20% certainty, the person that I see in the distance is not the person that I think it is, whereas above 75% I decide that it is the person concerned.

Inference rules (steps E and F in FIG. 2: definition of inference rules and measurement) imply a sequence of logical operations and conditions relating inputs and the output that can be adapted in more or less detail depending on the case to be treated. The following table indicates composition modes relating the two groups to make the decision about membership or not membership to the reference type. Note in this case that the two groups obtained by segmentation (step C) are dissimilar groups. Therefore membership to the two groups is not sufficient to eliminate the ambiguity about membership to the type. This is why a − sign is assigned in the table when E1 and E2 are equal to +.

Inference rules between inputs (the degree of membership to group 1 or 2) and the output (degree of certainty that it is a car) are as follows. The two inputs being related to the output by an OR function (in other words the maximum of the two values in fuzzy logic) in the case of low probabilities and the AND function for high probabilities.

TABLE 1 inferences between inputs and the output.

| E1/E2 | − | = | + |
|---|---|---|---|
| − | − | − | = |
| = | − | = | + |
| + | = | + | − |

This table is interpreted as follows:

If (E1+ and E2+) or (E1− and E2−) or (E1− and E2=) or (E1= and E2−) then S−.

(If the resemblance to shape 1 and to shape 2 is low or the resemblance to shape 1 is low and to shape 2 is mediocre, or the resemblance to shape 1 is mediocre and to shape 2 is low, then it is not probable that it is a car.

If (E1= and E2=) or (E1+ and E2−) or (E1− and E2+) then S=.

If (E1+ and E2=) or (E1= and E2+) then S+.

We will now give an example of an algorithm for the composition of inference rules for a number of arbitrary groups.

Each characteristic may be in three states (+, −, =) or for n characteristics, $3^n$ possible combinations.

In this step, the values will be initialized to S+; S−; and S= to 0.

For each of these $3^n$ combinations:
the sign and value of elements of the composition are identified;
Min is calculated as being the minimum of all elements in the combination;
the number of "+" elements and the number of "−" elements are counted for each combination.

The results are then interpreted as follows:
if the number of "+" elements is less than 30% of the number of elements in the combination and equal to at least one element (using the closest integer value to the 30% (for example if the value is 0.7, then we will use 1), then if Min is greater than the value S+, the value S+ is defined as being equal to Min;
if the number of elements is more than 70%, then if Min is greater than the value S=, the value of S= is defined as being equal to min;
if the number of elements is between 30 and 70%, then if Min is greater than the value S=, the value of S= is defined as being equal to Min).

The output from this system (steps G and H: defuzzying and cross-checking) is in the form: the object corresponds (for example) 80% to type T1, 65% to type T2, etc. In our example, we are limited to a single type T1=car.

Defuzzying consists of evaluating the output magnitude (in this case the probability of membership to a given type). This is given by projecting the state of input variables onto output variables through inference rules. In practice, membership functions of output variables are reduced (decapitated) as a function of results output by logical (fuzzy) operations dictated by inference rules. The following section gives an illustrated example of this operation.

Figure 7:
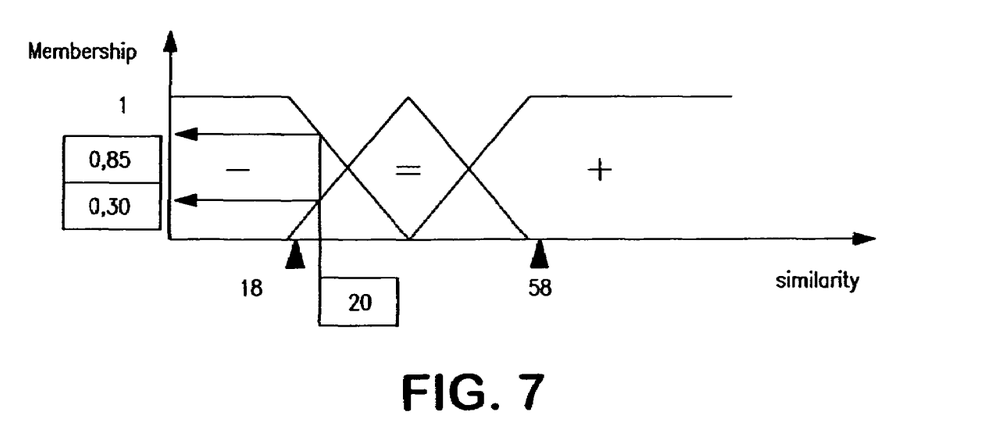
Figure 8:
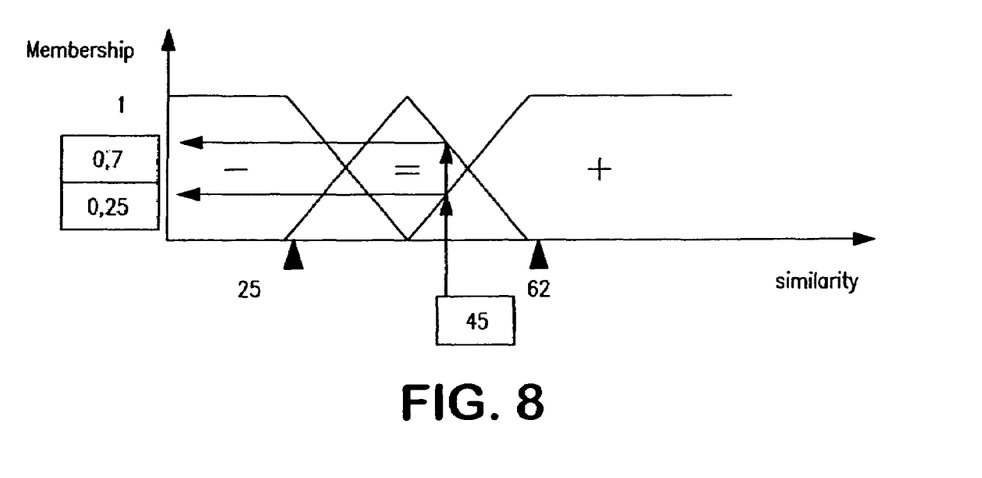

We will now give an application example. It will be considered that after the learning phase, each group has the following characteristics (FIGS. 7 and 8):

| Similarity/group | 1 | 2 |
|---|---|---|
| Similarity − min % | 18 | 25 |
| Similarity − max % | 58 | 62 |

We will consider that an image has a shape that has the following errors, after comparison with the two reference shapes:

| Similarity/group | 1 | 2 |
|---|---|---|
| Sim | 20 | 45 |

If (E1+ and E2+) or (E1− and E2−) or (E1− and E2=) or (E1= and E2−) then S−

S−=Max [Min (0,0.25), Min (0.85,0), Min (0.85,0.7), Min (0.3,0]=0.7

If (E1= and E2=) or (E1+ and E2−) or (E1− and E2+) then S=

S==Max [Min (0.3,0.25), Min (0,0), Min (0.85, 0.25)]=0.25

If (E1+ and E2+) (E1+ and E2=) or (E1= and E2+) then S+
S+=Max [Min (0, 0.7), Min (0.3, 0.25)]=0.25.

Figure 9:
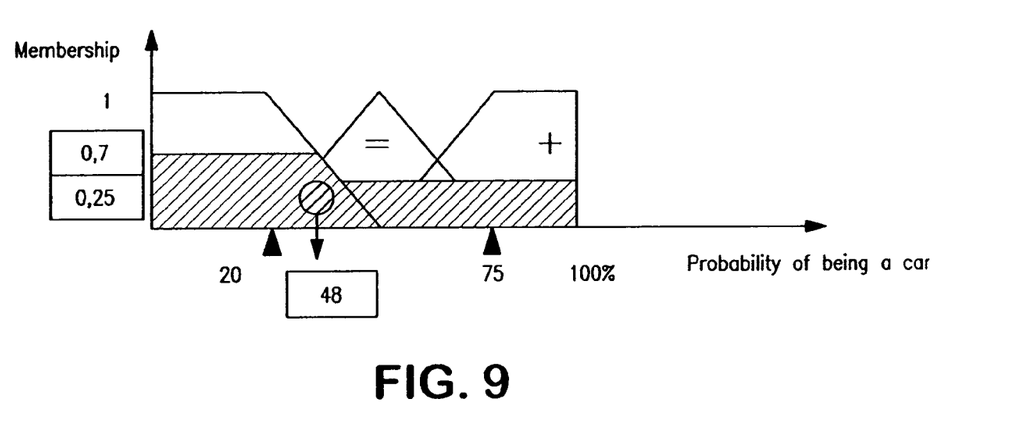
FIG. 9 shows a plot representing a membership probability as a function of an average of errors measured on two characteristics.

The result 48 corresponds to the center of gravity of the three sets (−, +, =) of the output, reduced to 0.7, 0.25, 0.25 respectively (cross-hatched surface, FIG. 9).

Therefore, the result is "the chance of it being a car is 48%". We cannot make any cross-checks because in our example we are limited to a single type.

In reality, we will also add a step consisting of using probabilities of membership to different types thus obtained in combination with a series of affinity relations between types, affinities representative of human perception, so as to elect memberships that are both majority in probability and that are co-designated by their affinity relation, and so as to exclude memberships with a lower affinity with elected types.

This step, in combination with the previous steps, can significantly multiply the precision of the analysis. Globally, this method is attractive since it provides a law for composition for fuzzy inputs which is difficult to manage when there is a large number of inputs.

What is claimed is:

1. A method for automatically describing an unknown multimedia object in which the unknown object is associated with a plurality of reference multimedia objects depending on a probability of membership to each considered type of said plural reference multimedia objects such that multimedia objects having memberships in each considered type of said plural reference multimedia objects and a lower affinity to elected multimedia objects having memberships in each type of said plural reference multimedia objects are excluded, the method comprising the steps of:

measuring at least one physical characteristic of the unknown multimedia object and comparing the at least one physical characteristic of the unknown multimedia object with measurements of characteristics which best represent each type of said plural reference multimedia objects;

using at least one probabilistic relation for each type of said plural reference multimedia objects to obtain a probability that the unknown multimedia object is a member of the type of said plural reference multimedia objects considered based on a result of the comparison of the at least one measured physical characteristics of the unknown object to the measurements of the characteristics which best represent each type of said plural reference multimedia objects;

electing the multimedia objects having memberships in each type of said plural reference multimedia objects which form a majority of probabilities associated with each type of said plural reference multimedia objects considered and which are co-designated by an associated affinity relation using obtained probabilities that the unknown multimedia objects are members of different types of said plural reference multimedia objects in combination with a series of affinity relations between each type of said plural reference multimedia objects such that the multimedia objects having memberships in each considered type of said plural reference multimedia objects and the lower affinity to the elected multimedia objects having memberships in each type of said plural reference multimedia objects are excluded.

2. The method according to claim 1, further comprising a preliminary step of:

defining reference characteristics of a type of said plural reference multimedia objects starting from a group of multimedia objects presumed to represent each type of said plural reference multimedia objects, said step of defining the reference characteristics comprising:

measuring a physical characteristic of the group of multimedia objects; and obtaining at least one reference value for the measured characteristic, said at least one reference value being used to define the probability of membership relation to the type of said plural reference multimedia objects as a value to which the measurement of the at least one physical characteristic of the unknown object is compared to determine the probability of membership to the type of said plural reference multimedia objects.

3. The method according to claim 2, further comprising the step of:
performing an automatic search in an information system with an Internet downloader and an Internet search engine to provide the group of multimedia objects.

4. The method according to claim 1, further comprising a preliminary step of:
measuring a frequency of simultaneous occurrence of types of said plural reference multimedia object in a set of descriptive objects to determine existence of an affinity between at least two types of said plural reference multimedia objects when the types of said plural reference multimedia objects have a specific simultaneous rate of occurrence.

5. The method according to claim 1, further comprising the step of:
recognizing a shape of the unknown multimedia object;
wherein at least one reference shape of the unknown multimedia object to be recognized comprises a physical characteristic belonging to a definition of one of the types of said plural reference multimedia objects.

6. The method according to claim 5, wherein the shape recognizing step includes a similarity measurement between a determined shape of the unknown multimedia object and the at least one reference shape, and utilization of a predefined relation which provides a probability of membership of the unknown multimedia object to the type of said plural reference multimedia objects as a function of the shape similarity measurement made between the determined shape of the unknown multimedia object and the at least one reference shape.

7. The method according to claim 1, wherein the at least one type of physical characteristic of the unknown multimedia object includes a plurality of reference characteristics;
wherein at least two measurements are performed on the unknown multimedia object to generate a proximity measurement with each of said plural reference characteristics;
the probability of membership in the type of reference characteristics is performed using at least two relations, each providing a probability of membership to the type of reference characteristics as a function of a proximity to a different characteristic;
wherein the at least two probability relations are used to set up a resultant global probability of membership of the object to the type of reference characteristics considered.

8. The method according to claim 7, wherein the at least two relations which each provide the probability of membership to the type of reference characteristics are used in accordance with combinational fuzzy logic to provide the resultant global probability of membership of the unknown multimedia object to the type of reference characteristics considered.

9. The method according to claim 1, further comprising the step of:
implementing fuzzy logic comprising a mechanism that provides a single probability of membership to a reference type of characteristic starting from a combination of similarity probabilities with different characteristics to the reference type of characteristic.

10. A device for automatically providing a description of an unknown multimedia object in which the unknown object is associated with a plurality of reference multimedia objects depending on a probability of membership to a considered type of said plural reference multimedia objects the device comprising:
means for measuring at least one physical characteristic of the unknown object and comparing the at least one physical characteristic of the unknown object with measurements of characteristics which best represent each type of said plural reference multimedia objects;
means for using at least one probabilistic relation for each type of said plural reference multimedia objects to provide a probability that the unknown multimedia object is a member of the type of said plural reference multimedia objects considered based on a result of the comparison of the at least one measure physical characteristics of the unknown object to the measurements of the characteristics which best represent each type of said plural reference multimedia objects;
means for electing multimedia objects having memberships in each type of said plural reference multimedia objects which form a majority of probabilities associated with each type of said plural reference multimedia objects considered and which are co-designated by an associated affinity relation using obtained probabilities that the unknown multimedia objects are members of different types of said plural reference multimedia objects in combination with a series of affinity relations between each type of said plural reference multimedia objects such that multimedia objects having memberships in the type of said plural reference multimedia objects having a lower affinity to the elected multimedia objects in the type of plural reference multimedia objects are excluded.

11. The device according to claim 10, further comprising:
processing means for utilizing a plurality of groups of reference multimedia objects, each of said plural groups providing a best representation of a corresponding type of said plural reference multimedia objects, said processing means being configured to measure at least one physical characteristic for an entire group considered, and for deriving a reference measurement for the at least one physical characteristic for the entire group considered from the at least one physical characteristic, the derived reference measurement being utilized to define a relationship providing a probability of membership to the type of said plural reference multimedia objects considered as a measurement to which the device compares a measurement of an unknown object to determine the probability of membership to the type of said plural reference multimedia objects considered.

12. The device according to claim 10, further comprising:
means for preliminarily measuring a frequency of occurrence of types of said plural reference multimedia object in a set of descriptive objects, and for determining an existence of an affinity between at least two types of said plural reference multimedia objects when types of said plural reference multimedia objects have a specific simultaneous rate of occurrence.

13. The device according to claim 11, further comprising:
means for preliminarily measuring a frequency of occurrence of types of said plural reference multimedia object in a set of descriptive objects, and for determining an existence of an affinity between at least two types of said plural reference multimedia objects when types of said plural reference multimedia objects have a specific simultaneous rate of occurrence.

* * * * *